(12) United States Patent
Guerrero et al.

(10) Patent No.: US 6,185,439 B1
(45) Date of Patent: Feb. 6, 2001

(54) METHOD FOR PROVIDING ON DEMAND SERVICE MEASUREMENTS

(75) Inventors: Arturo Guerrero, Carol Stream; Terry George Hinrichs, St. Charles; Kuo-Ting Hsu, Naperville; Dale Oliver Knudson, Glen Ellyn; Todd Hamilton Smith, Glendale Heights, all of IL (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/285,590

(22) Filed: Apr. 2, 1999

(51) Int. Cl.[7] ........................................ H04M 1/00
(52) U.S. Cl. .................. 455/560; 455/67.1; 379/242
(58) Field of Search .................. 455/423, 424, 455/425, 67.1, 560; 379/243, 242, 244

(56) References Cited

U.S. PATENT DOCUMENTS 4,259,549 * 3/1981 Stehman ................. 379/244
4,268,722 * 5/1981 Little et al. ............. 455/560
4,998,289 * 3/1991 Rabe et al. .............. 455/423

* cited by examiner

*Primary Examiner*—Nay Maung
*Assistant Examiner*—Quochien Vuong
(74) *Attorney, Agent, or Firm*—Brown, Pinnisi & Michaels P.C.

(57) ABSTRACT

In a digital switching network system wherein service measurements are periodically automatically collected, a user interfaces with the network via a Web browser to select those traffic counts of interest for on-demand sampling. The user designates whether the selected traffic counts are retrieved as a single sample or as a periodic sample. When the traffic counts are to be retrieved as a periodic sample, the user designates a period for the periodic sample. The system determines the locations where the traffic counts resides in the network, retrieves the traffic counts from their locations, and displays the traffic counts to the user.

14 Claims, 9 Drawing Sheets

| Categories | |
|---|---|
| * Cell | Select a Cell Site [22/34/48] □ <br><br> Choose an SM Report Type <br><br> • AGGR-S <br> • AGGR-L <br> • DCCH-CS <br> • CDMA-CS <br> • CP-AMPS <br> . . . |

Report types correspond to sections in an SM hourly report

Fig. 5A

| Categories | One or more of the following may be on a page: |
|---|---|
| | Select Antenna Face: 1 ☐ |
| | Select Vocoder Type: 8K ☐ |
| | Select Mobile Power Class: 1 ☐ |
| | Select Server Group and Antenna Face: Server Group 0, Antenna Face 1 ☐ |

Fig. 5B

| Categories | Make choices - antenna face, vocoder type, etc.<br>Then choose<br>  ALL<br>or only those checked<br>  aaaaa (1) Long name for aaaaa<br>  bbbbb (2) Long name for bbbbb<br>  ccccc (3) Long name for ccccc<br>  . . .<br><br>[Submit] |
|---|---|

You may choose any set of counts from this group

Fig. 5C

| Single ☐ | Interval 30 | CANCEL |
| Periodic | Duration 60 | START |

| Cntr_1 | | | | |
|---|---|---|---|---|
| Cntr_2 | | | ... | |
| Cntr_10 | | | | |

Fig. 5D

Make choices, START and CANCEL; can do more than one retrieval from this page; Cntr name matches AutoPace name, number matches hourly.

|  | Date Time Status | Date Time Status | Date Time Status | Date Time Status |
|---|---|---|---|---|
| Cntr_1 | | | | |
| Cntr_2 | | | | |
| ... | | | | |
| Cntr_10 | | | | |

Most recent at right – up to 100 intervals
Date/Time + Status for each interval
Can scroll up/down to see other counters;
Can scroll left/right to go forward/backward in time
"Real Time" data retrieval

Fig. 5E

METHOD FOR PROVIDING ON DEMAND SERVICE MEASUREMENTS

FIELD OF THE INVENTION

The invention pertains to the field of wireless telecommunications systems. More particularly, the invention pertains to a method and apparatus for a user to obtain on-demand service measurements of system usage.

BACKGROUND OF THE INVENTION

The Lucent Technologies Autoplex® Cellular Telecommunications System System-1000 is a complete wireless telecommunications system whose major components include the Executive Cellular Processor (ECP) Complex, a 5ESS-2000® Digital Cellular Switch (DCS), and a plurality of cell sites. Autoplex® and 5ESS-2000® are registered trademarks of Lucent Technologies.

Service Measurements (SM) is a SM tool which allows a customer the ability to monitor call traffic and performance of their system which in turn helps them make the necessary adjustments via Recent Change/Verify forms to add new equipment, adjust existing resources, adjust timer values, re-try attempts etc. to obtain maximum performance from the system.

The CCS is the traditional unit of measurement for expressing switched traffic load. A CCS unit represents one hundred (C-Roman numeral for 100) call (C) seconds (S). Traffic components (lines, trunk, calls, etc.) are scanned every 100 seconds. Each time a busy condition is found, a counter is incremented. Thirty-six 100-second scans are completed in an hour (1 Hour=3600 Seconds=36 CCS). At the end of each hour, the measuring device is recycled. If one call is busy for 30 minutes during an observation interval, a usage of 18 CCS will be measured. However, if 18 calls are busy for 100 seconds each in the observation period, 18 CCS will also be measured. Therefore, usage is a function of the number of calls and duration of time (holding time) each call is busy.

The Erlang is a well-established international unit of traffic measurement equal to the average number of busy resources or, equivalently, the average resource usage expressed in some arbitrary unit of time. Erlangs need not be referenced to any specific time interval. However, the unit of time used to express usage or call rate must always be the same unit used to express holding time and observation interval. Since traffic-engineered components are sized for a busy-hour load, a 1 hour time interval will be the base for all Erlang units used. Therefore, 1 unit of Erlang usage is equal to 36 units of CCS usage. Consider a simple example of a system that generates 3000 calls over a 1 hour observation period with an average holding time of 200 seconds per call. The traditional CCS usage would be the product of calls times holding time divided by 100: (3000 calls)(200-second holding time)/100=6000 CCS. To describe the traffic usage in units of Erlangs, the calls times holding time product would be divided by the observation interval in seconds (3600 seconds): (3000 calls) (200-second holding time)/3600=167 Erlangs.

All usage counts are stored in units of 1/100 Erlangs, unless specified otherwise (i.e., divide the usage count by 100 to get Erlangs). A usage of 1 Erlang would result if one trunk within a 3 trunk group was busy for one hour. In this case, "100" would be stored in the SM data files on disk. Similarly, if 200 trunks within a trunk group were busy for one hour, 200 Erlangs would result and "20,000" would be recorded in the SM data files on disk. The usage for a resource is determined by looking at the number of facilities (for example, trunks) in use every 10/100 second cycle, and accumulating this number.

Service measurement data are collected from the system's components, including the ECP, DCS's, cell sites, micro-cell sites, link nodes such as the Cell Site Node (CSN), Digital Switch Node (DSN), and Inter-Cellular Node (ICN), and other nodes that make up the telecommunications system, such as the Direct Link Node (DLN), the Inter-processor Message Switch/Common Network Interface (IMS/CNIO), and the Signaling System 7 (SS7). Service Measurements also allows customers to forecast or anticipate the future needs of their system so they can position themselves to offer the best quality service to the end-user. Currently, SM data are provided on an hourly basis, which does not allow the user to look for peaks, or enable the user to view the results of changes they have made on their system in a shorter interval. Customers have shown a need to view a subset of their SM counts which are related to both changes they have made in their system, and to show peaks in system resources in a shorter time frame than the current hourly interval.

SUMMARY OF THE INVENTION

This invention allows a user, through the use of a Web based (either intra or inter net) browser, to collect and view Service Measurement data in near real time via a web page. At least five invocations of the SM tools are supported at any one time. Once the maximum number of invocations is reached, new (additional) users are given an error and told to try at a later time. The SM tool reports Service Measurements traffic count data which lends itself to this shorter reporting period, and not Plant Measurements or special studies data. The invention allows the user to collect either a single SM count or a grouping of SM counts. The collection interval is user defined, being either a single snapshot or a programmable interval for a time lapse display of the SM count(s). If a user selects the programmable interval feature, the user is able to set the collection interval via the web page. A single display screen allows the user to display the count(s) requested. If multiple counts are requested, a minimum of 10 counts are displayed per screen. If the programmable interval is selected, the user is able to view at least four time intervals of the counts selected at any one time. The user is informed of any corruption of the data being displayed.

Briefly stated, in a digital switching network system wherein service measurements are periodically automatically collected, a user interfaces with the network via a Web browser to select those traffic counts of interest for on-demand sampling. The user designates whether the selected traffic counts are retrieved as a single sample or as a periodic sample. When the traffic counts are to be retrieved as a periodic sample, the user designates a period for the periodic sample. The system determines the locations where the traffic counts resides in the network, retrieves the traffic counts from their locations, and displays the traffic counts to the user.

According to an embodiment of the invention, a method for a user to obtain on-demand service measurements in a digital switching network wherein service measurements are periodically automatically collected includes (a) selecting at least one traffic count; (b) providing a choice to the user whether the at least one traffic count is to be retrieved as a single sample or as a periodic sample; (c) determining a location where the at least one traffic count resides in the network; (d) retrieving the at least one traffic count from the location; and (e) displaying the at least one traffic count to the user.

According to an embodiment of the invention, an apparatus for a user to collect on-demand service measurements in a digital switching network wherein service measurements are periodically automatically collected includes selection means for the user to select at least one traffic count to be collected; means for providing a choice to the user whether the at least one traffic count is to be retrieved as a single sample or as a periodic sample; determining means, associated with the selection means, for determining a location where the at least one traffic count resides in the network; means, associated with the selection means and the determining means, for retrieving the at least one traffic count from the location; and means for displaying the at least one traffic count to the user.

According to an embodiment of the invention, an apparatus for a user to collect on-demand service measurements in a digital switching network wherein service measurements are periodically automatically collected includes a first computer processor; a second computer processor; a browser installed in the second computer processor; the first computer processor being linked to the second computer processor; means, in the second computer processor, for selecting at least one traffic count to be collected; means, in the second computer processor, for providing a choice to the user whether the at least one traffic count is to be retrieved as a single sample or as a periodic sample; means, in the first computer processor, for determining a location where the at least one traffic count resides in the network; means, in the first computer processor, for retrieving the at least one traffic count from the location; and means, associated with the second computer processor, for displaying the at least one traffic count to the user.

DESCRIPTION OF THE PREFERRED EMBODIMENT

Figure 1:
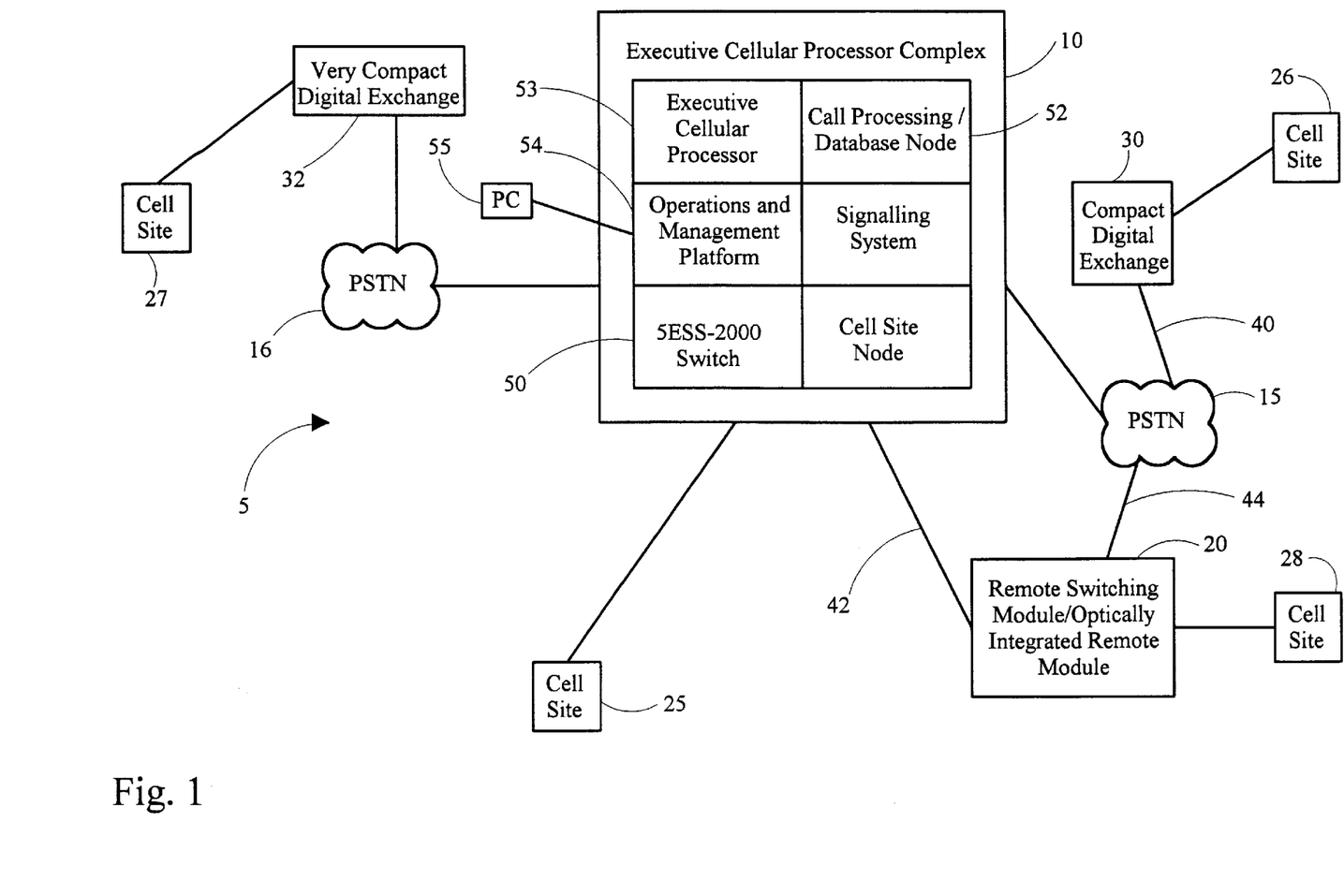
FIG. 1 shows a schematic of a digital switching network employing an embodiment of the present invention.

Referring to FIG. 1, a configuration of a digital switching network such as Lucent Technologies AUTOPLEX® Cellular Telecommunications Systems System 1000 includes an Executive Cellular Processor Complex (ECP Complex) 10 which connects to one or more networks such as a Public Switched Telephone Network (PSTN) 15 or a Public Switched Telephone Network (PSTN) 16, to a separate switching module such as Remote Switching Module/Optically Integrated Remote Module (RSM/ORM) 20, or directly to a cell site 25. An Executive Cellular Processor (ECP) 53, such as Lucent's 3B21D processor, provides processing and controlling functions between the ECP Complex 10 components.

Smaller variations of ECP Complex 10 such as a Compact Digital Exchange (CDX) 30 and a Very Compact Digital Exchange (VCDX) 32 are connected to separate PSTNs 15. CDX 30 and VCDX 32 each contain an ECP (not shown) in them. CDX 30, VCDX 32, and RSMJORM 20 are then connected to separate cell sites 26, 27, and 28, respectively. In this way, a mobile subscriber connected to cell cite 27 serviced by VCDX 32 can call a subscriber connected via cell site 26 to CDX 30. The call is routed from cell site 25 through VCDX 32 over PSTN 16 to ECP Complex 10. Within ECP Complex 10, a digital switch such as a 5ESS®-2000 Switch 50 relies on subscriber information contained in a Call Processing/Database Node (CDN) 52 to route the call via PSTN 15 and CDX 30 to the subscriber connected via cell site 26. If a link 40 between ECP Complex 10 and PSTN 15 is down, the call is automatically alternately routed, shown here as going over a link 42 to RSM/ORM 20 which in turn is linked to PSTN 15 by a link 44.

In the current Lucent Technologies AUTOPLEX® Cellular Telecommunication System Architecture, service measurements (SM) are collected hourly in an Operations Management Platform (OMP) 54. Service measurements refer to measurements such as Peg Counts (cumulative counts), Overflow (both number of times and duration), and Usage (the number of facilities used) which provide system diagnostic reports for assessing system performance as well as long-term traffic analysis for overall system planning. The Peg Count is a cumulative count of the number of times an attempt to cause a specific event failed during a fixed time interval. The Overflow count is a cumulative count of the number of times an attempt to cause a specific event failed during a fixed time interval because of the lack of specific resources. The Usage count is a cumulative count of the number of facilities (e.g., trunks in a trunk group, registers of a certain kind, etc.) found in the busy states during periodic scans that occurred within a fixed time interval, usually a 10-second interval or a 100-second interval.

OMP 54 is an operations, administration, and maintenance (OA&M) system with its own dedicated processor which allows network problems to be resolved without interruptions to call handling. The present invention, referred hereafter as the "SM tool", enhances the current capabilities by allowing a user the ability to view SM traffic counts on variable time interval in addition to the automatic hourly SM collections. The user is preferably able to designate the duration of the collection in addition to starting and stopping the collection process.

Any existing SM traffic counts which are collected hourly are collectible using the SM tool. Other measurements such as plant measurements, VCSA, PLM, and Handoff Matrix, which are Special Engineering Studies (SES) tools run on a limited basis with the data being formatted and displayed via the AUTOPACE Operations System, are not available for collection via the preferred embodiment of the present invention.

This SM tool does not affect the current collection and storage of SM data on the OMP. The running of this SM tool increases traffic on the CNI (Common Network Interface) ring, which is used to carry call processing messages as well as operations, administration, and performance messages between managed units of the Lucent Technologies AUTOPLEX® Cellular Telecommunication System Architecture, and depending on the customers data request, could have some minor effect on ring traffic. The reporting of data from a managed object, is at a low priority so as to not effect call processing.

If during the running of the SM tool, the OMP goes down or re-initializes, the server is restarted upon re-initialization, but individual user sessions are not automatically restarted. It is the user's responsibility to re-run individual sessions rather than having the SM tool perform user session re-initialization.

The selection of counts to be polled follow a natural grouping based on the categories in the existing hourly SM output report (e.g. CELL, LAF, PAF). A normal size system produces a report that is typically about 500 pages long. Sample copies of such a report are found in the SM Manual (401-610-135) referenced above.

The SM On-demand feature (SM-OD) provides a method for the customer to retrieve the current value of specific Service Measurement counts. Access is preferably through a web based interface. Specific counters to be retrieved are chosen by working through a series of menus. It is assumed that one skilled in the art has some basic understanding of the internet and web servers.

The SM On-demand feature provides the user real-time access to the current value of specific Service Measurements counters. From a very high level, the first thing a user has to do is specify the counts that are to be viewed (REQUEST). The next thing that takes place is that the feature sends the request to the appropriate processor where special software receives the message, reads the current counter values, and returns the data (RETRIEVAL). After the data is returned to the user, it is shown on a screen (DISPLAY).

Figure 2:
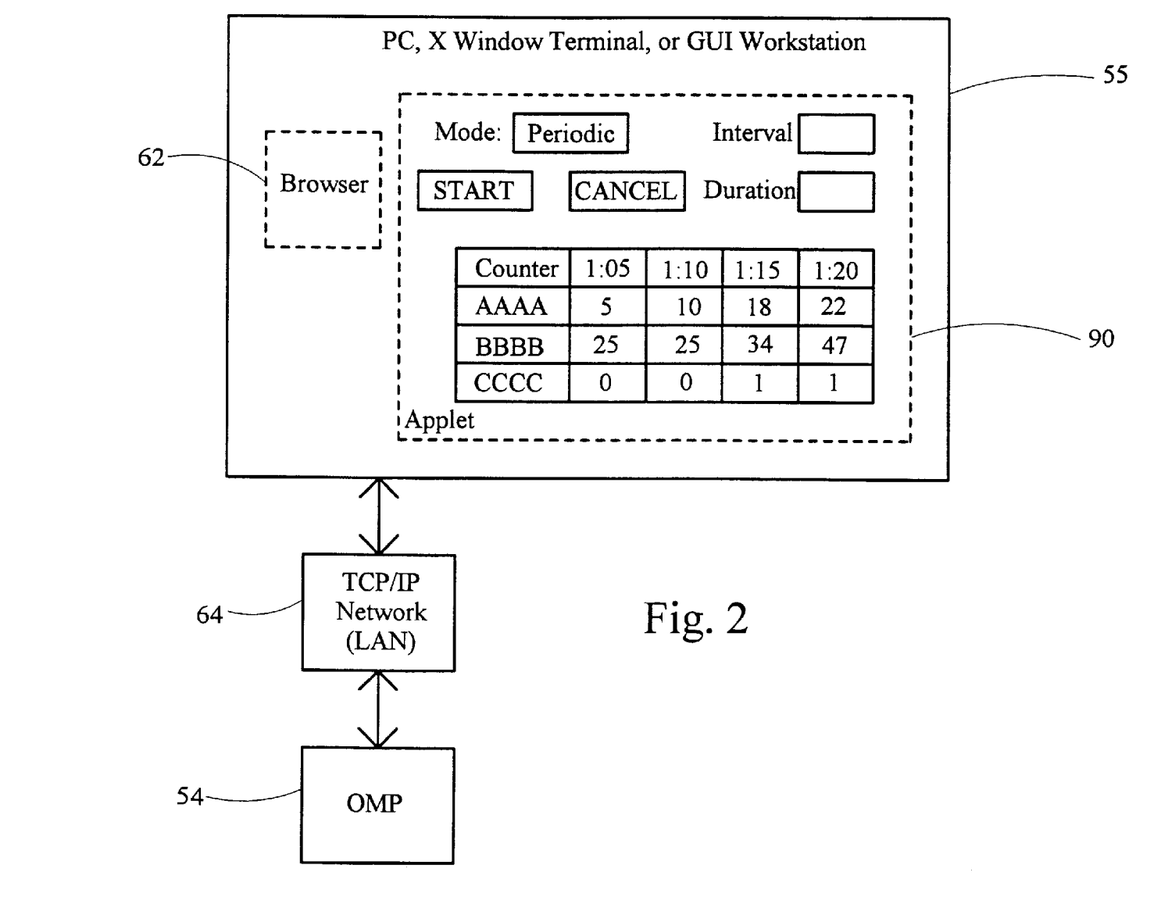
FIG. 2 shows a diagram of a PC, X Window Terminal, or GUI Workstation employed by a user in obtaining on-demand service measurements according to an embodiment of the present invention.

Referring to FIG. 2, the main components of the invention are shown. The user accesses the SM On-demand feature from a PC, an X-window terminal, or a GUI workstation such as a PC 55. A browser 62 such as Netscape 3.01 or later browser is installed in PC 55. PC 55 is connected to OMP 54 over a TCP/IP Network 64 of OMP 54.

As a high-level description, OMP 54 receives a user request which contains information about the user, the count type, the counts selected, and destination processor information (cell, CDN, etc.). Most of this data is stored in an array of structures for use later when the data actually is returned from the destination processor. There is also information concerning whether this is a one time request or a periodic request. If it is a one time request, a four (4) second timer is set when the message is sent to wait a period of time for a response. If the response comes outside that window, the message is discarded and the error flag is set for the user. If the request is a periodic request, the four second timer is set up for the response window, while another timer is set for the interval of the collection. This timer fires when that interval is up so the message can be sent again.

This process continues until OMP 54 receives a stop message or the duration specified in the request is exceeded. If no duration is specified, a default duration of one hour is used. If OMP 54 determines this message is bound for a cell, it uses UX messaging (i.e., the Unix messaging support subsystem) to get the message there. The message is constructed with enough information for the cell to make a choice of which measurements should be returned to OMP 54. The SM on demand message is received and routed to the appropriate function. The message contains enough information for the cell to determine which set of counts should be returned to OMP 54. Various sets of counts include PAF, Vocoder type, etc., which represent the logical groupings that are used in the Lucent Technologies AUTOPLEX® Cellular Telecommunication System Architecture. A Vocoder is a piece of equipment which is a pooled resource throughout the system. A PAF (Physical Antenna Face) is the lowest granularity the system has for a cell. One cell usually consists of three PAFs.

Once this set of counts is determined, all counts for this set are returned to OMP 54. OMP 54 picks the correct counts out of the message to return to the client. Only measurements for one cell's Physical Antenna Face (PAF) are preferably returned since the design strategy is to keep the interface as simple as possible. Data for one PAF fits in one message, whereas multiple PAF's would require multiple messages. In general, all count aggregation and selection are preferably done at OMP 54 rather than the cell site or CDN in order to conserve cell site and CDN resources.

Figure 3:
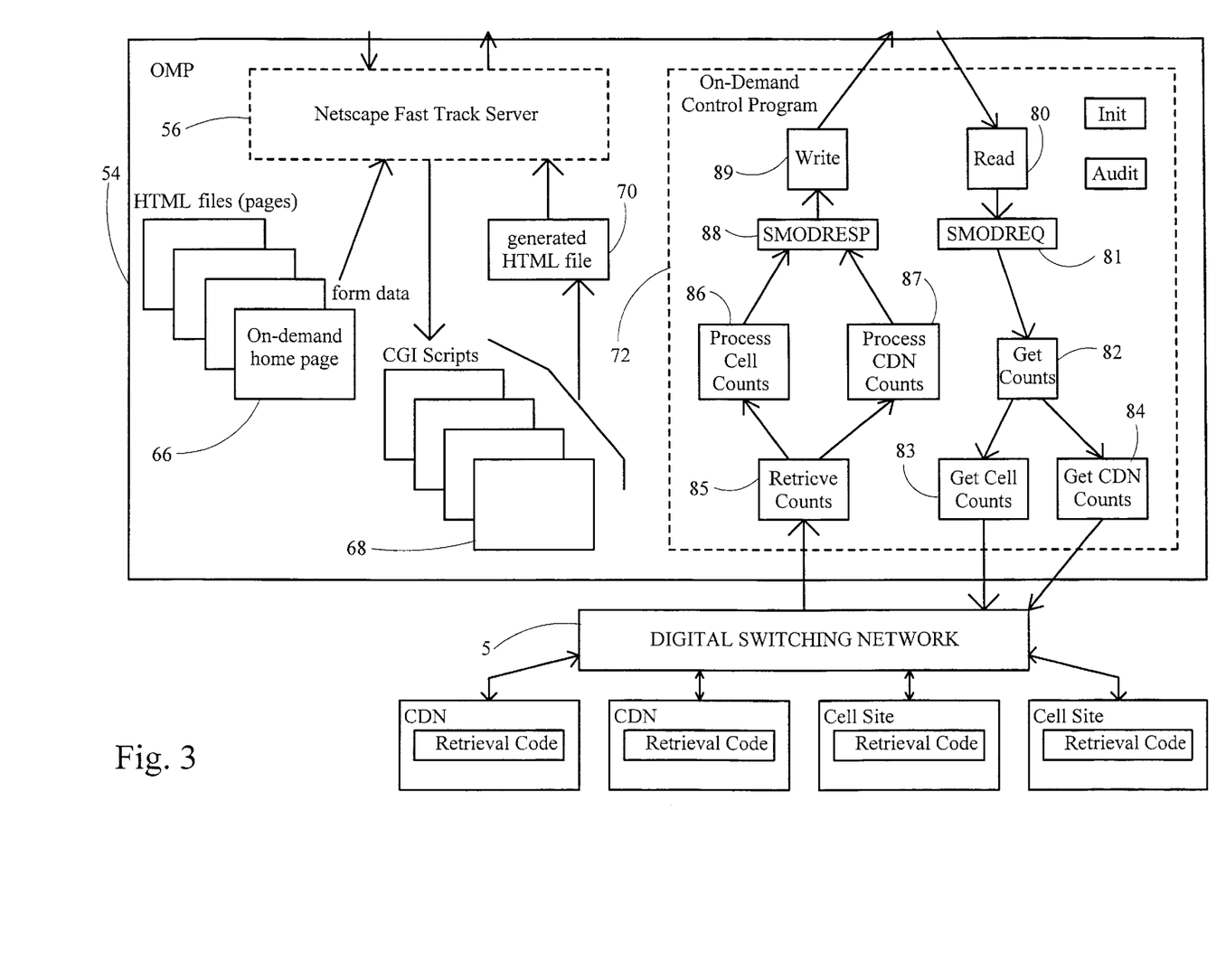
FIG. 3 shows a diagram used in explaining the process of obtaining on-demand service measurements according to an embodiment of the present invention.

Referring to FIGS. 2–3, a typical request sequence and data retrieval for a single sample is as follows:

The user starts browser 62 on PC 55. Then the user enters the On-demand internet address, i.e., the URL—Uniform Resource Location, which contains the protocol (http), the host name (the OMP 54 internet address), and the directory/filename at which to start (On-demand home page 66).

When an OMP 54 server 56, such as a Netscape Fast Track Server, receives the messages, it picks up the HTML file corresponding to on-demand home page 66 and sends it back to the user. Browser 62 displays on-demand home page 66 on PC 55. Preferably, on-demand home page 66 is formatted as a form. In this case, the user fills in the required data on the form and sends it back to server 56. The server 56 transfers the form data to a CGI script 68 which analyzes the data and generates an HTML file 70 which is sent back to the user. The CGI scripts 68 are preferably written in Perl, so they have to be interpreted. Although a Perl interpreter is needed for the CGI scripts, the Perl interpreter is already part of the OMP base system in Lucent's AUTOPLEX® Cellular Telecommunication System Architecture. This process continues, with the user working through a series of forms, until arriving at the form containing the counter(s) to be displayed.

This selected list of counters is passed back to OMP 54 and given to an On-Demand Control Program 72. Here, a request message is read in step 80, formatted in step 81 (SMODREQ stands for SM On-Demand REQuest), and sent via steps 82 and 83 or 84, over the network 5 as necessary, to the processor containing the desired counts within the specific CDN or cell site. In the processor, as well as each cell site or CDN, special retrieval code reads out the current count values and sends them back to OMP 54 in step 85. The counts are processed in steps 86 or 87, after which OMP 54 formats a response message in step 88 (SMODRESP stands for SM On-Demand RESPonse) which is returned to the client in step 89 and displayed on PC 55 in a display 90. When the service measurements are automatically retrieved for the hourly data, the counters are reset. Resetting preferably does not occur when the on-demand tool is used. A counter may appear to go backwards if it is checked before on demand before the hourly SM collection, and then again in the new hour.

Figure 4:
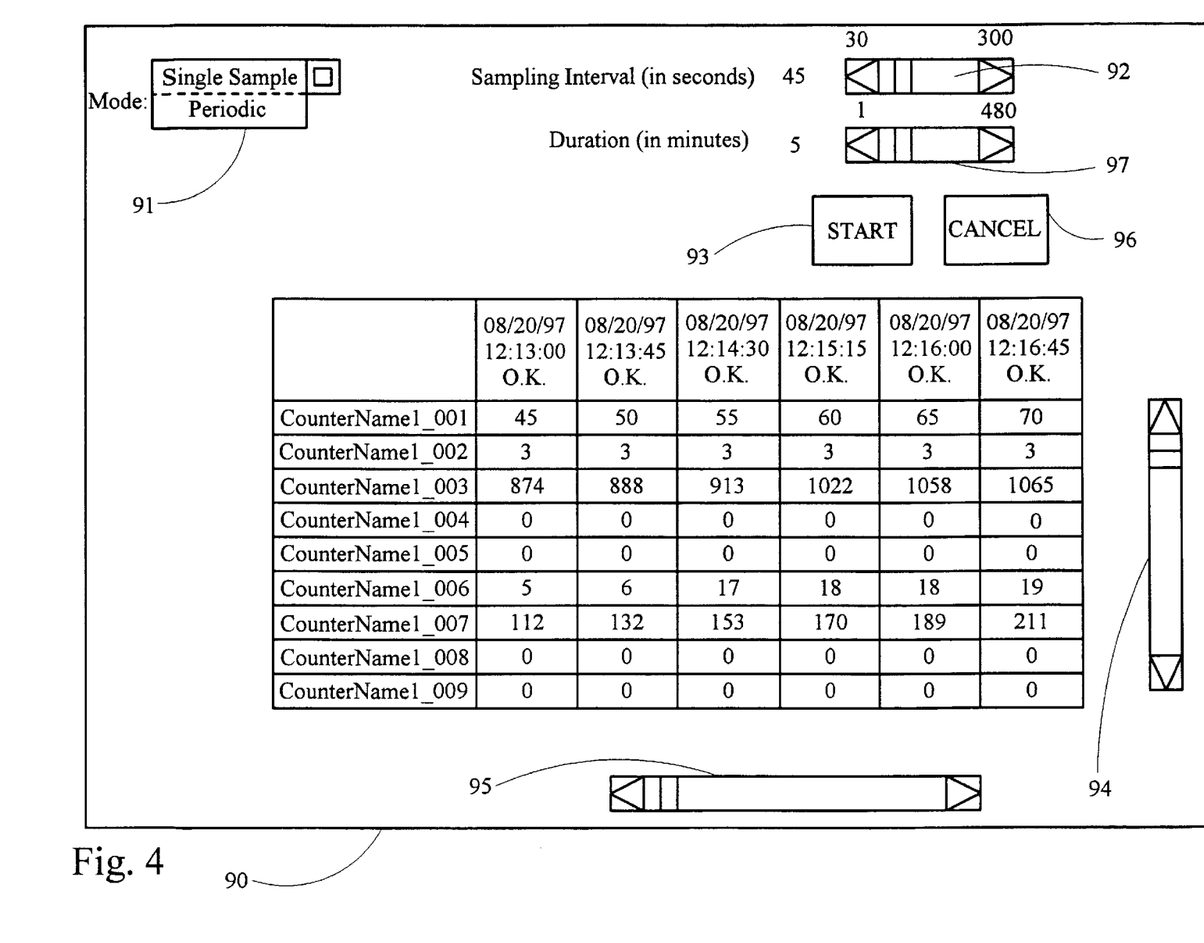
FIG. 4 shows a display screen displaying results of a service measurements on-demand request according to an embodiment of the present invention.

Referring to FIG. 4, display 90 is shown in detail. Display 90 preferably shows the date and time the data are collected as mm/dd/yy, hour, minute, and second. The time stamp is the time of collection, not the request or display time. The user is informed, on the display screen, if the data collected is corrupted. In one embodiment, the user is able to request counts only from a single form for each collection interval.

In addition to single sample requests, a second embodiment allows the user to request that counts be retrieved periodically at a fixed rate. For example, the user may specify a set of counters that are to be sampled every 45 seconds. FIG. 4 shows how this data could be displayed. The final request form could look like FIG. 4 with no data displayed. The counter names are on the form since we assume the user has already chosen the desired set of counters on the previous form. The mode is set to Periodic in a field 91 and a sampling interval of 45 seconds would be chosen using a sampling interval scroll bar 92, but could preferably be anything between 30 seconds and 5 minutes. When a start button 93 is clicked, a request goes out to the appropriate processor (e.g., cell, CDN, ECP). At the processor, a timer is set to go off every 45 seconds and initiate a request to retrieve counter values and send them back to server 56 (FIG. 3) which passes them back to the user. These counts, along with the time they were read and a status indicator, appear in the right most column. Each 45 seconds, as a new set of values arrives, the previous counts preferably shift left one column and the new counts are added on the right. A vertical scroll bar 94 is used to scroll lines up and down, thus increasing the number of counters allowed on one form. A horizontal scroll bar 95 allows the user to scroll back to see intervals that have passed off the screen. The process is stopped using a cancel button 96. A duration scroll bar 97 is used to designate the time frame for the periodic collection intervals.

A user can either run the SM tool on OMP 54 or on a workstation or personal computer (PC) 55 which is connected to OMP 54. As developed, the user brings up a Maintenance Home page, chooses an "On-Demand Service Measurements" selection from the Home page, and passes user authentication. The user then chooses which grouping (e.g., CELL or CDN) that the traffic count they want is in, and clicks on the appropriate entry. "CELL" refers to the traffic counts from a cell site such as cell site 27. "CDN" refers to traffic counts from a call processing/database node such as CDN 52.

Referring to FIGS. 5A–5E, the user then selects the specific unit (e.g., cell site 28, CDN 52) for the count which they are seeking. If further granularity of counts is available (e.g. LAF/PAF, CP-AGGR/CP-CDMA, PAF) the user then selects the appropriate selection. From here, the user can pick from the sub-accounts (e.g., AGGR-L, AGGR-S, DCCH-CS, CDMA-CS, CP-AMPS) that they are interested in.

As used herein, LAF is Logical Antenna Face, PAF is Physical Antenna Face, CP-AGGR is Call Processing-Aggregated Count, CP-CDMA is Call Processing-Code Division Multiple Access, AGGR-L is Aggregate-Long, AGGR-S is Aggregate-Short, DCCH-CS is Digital Control Channel-Cell Site, CDMA-CS is Code Division Multiple Access-Cell Site, and CP-AMPS is Call Processing-Advanced Mobile Phone Service.

Figure 5A:
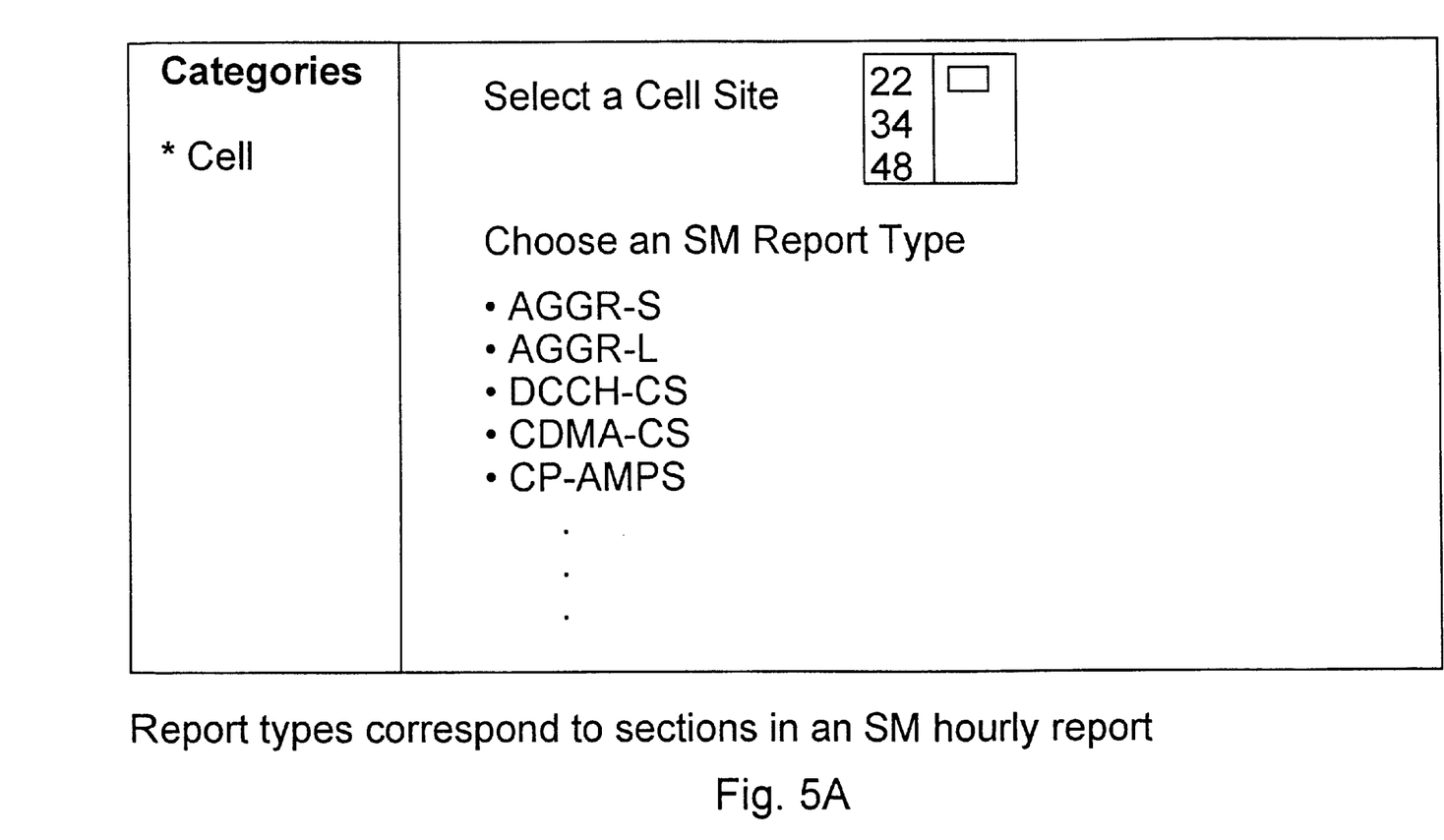
FIG. 5A shows a first display screen seen by the user using the present invention.
Figure 5B:
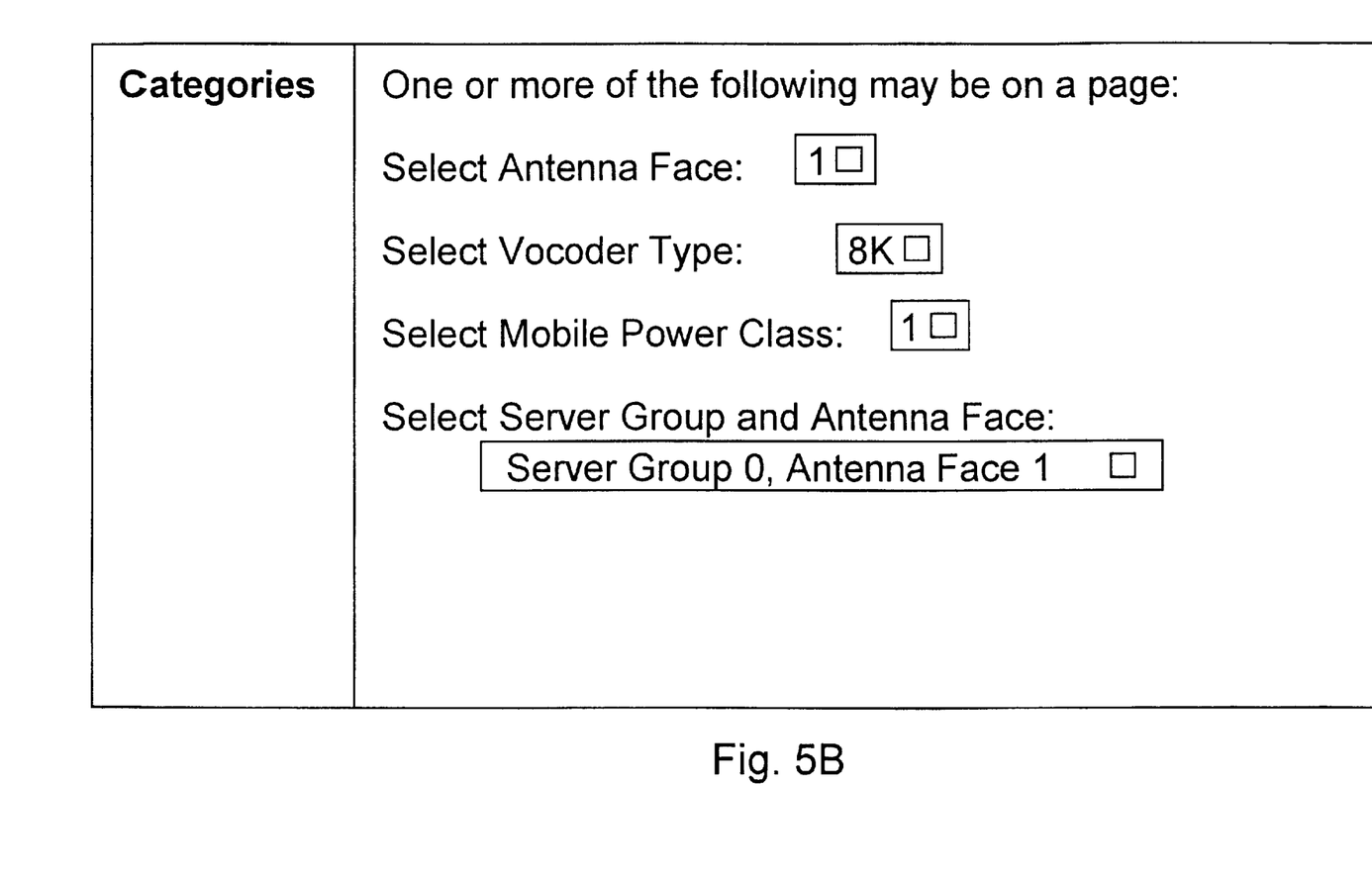
FIG. 5B shows the second display screen encountered the user using the present invention.

After completing the screen of FIG. 5A, the user selects from any choices that appear on the screen of FIG. 5B. If a particular choice doesn't appear, that means that the choice is not available for the selected cell site or CDN site. The Mobile Power Class refers to the power class rating that each type of mobile telephone has. The older car installed phones had a rating of 5 watts. The newer smaller phones run around 3 watts. The wattage and other mobile characteristics determine the Power Class. A cell may be divided into two Server Groups (0 and 1). This can be viewed as the superposition of a fragmentary smaller cell pattern on top of a complete larger cell pattern. The division of the cell site into SG-0 and SG-1 is done in the software by channel assignment, by adjusting the power levels emitted by antenna and handoff thresholds.

Figure 5C:
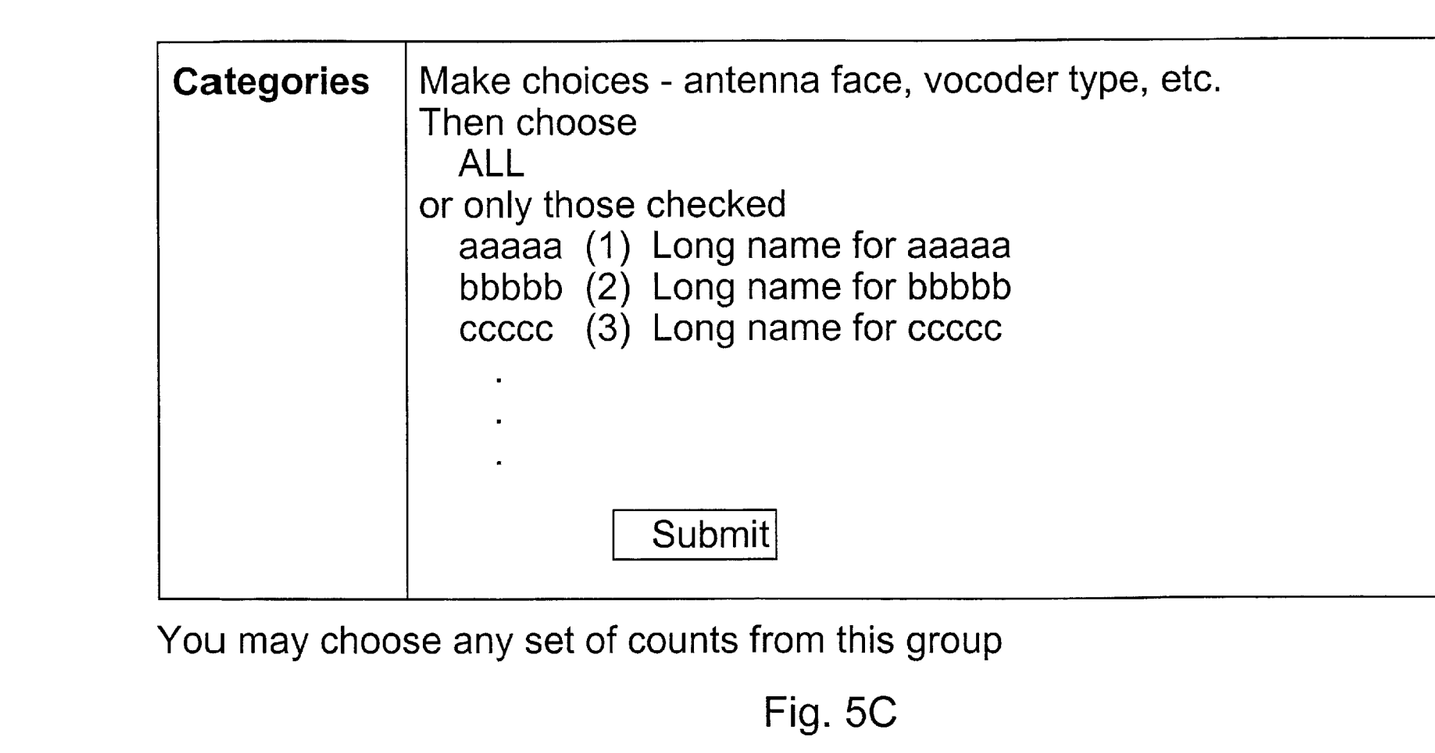
FIG. 5C shows the third display screen encountered by the user using the present invention.
Figure 5D:
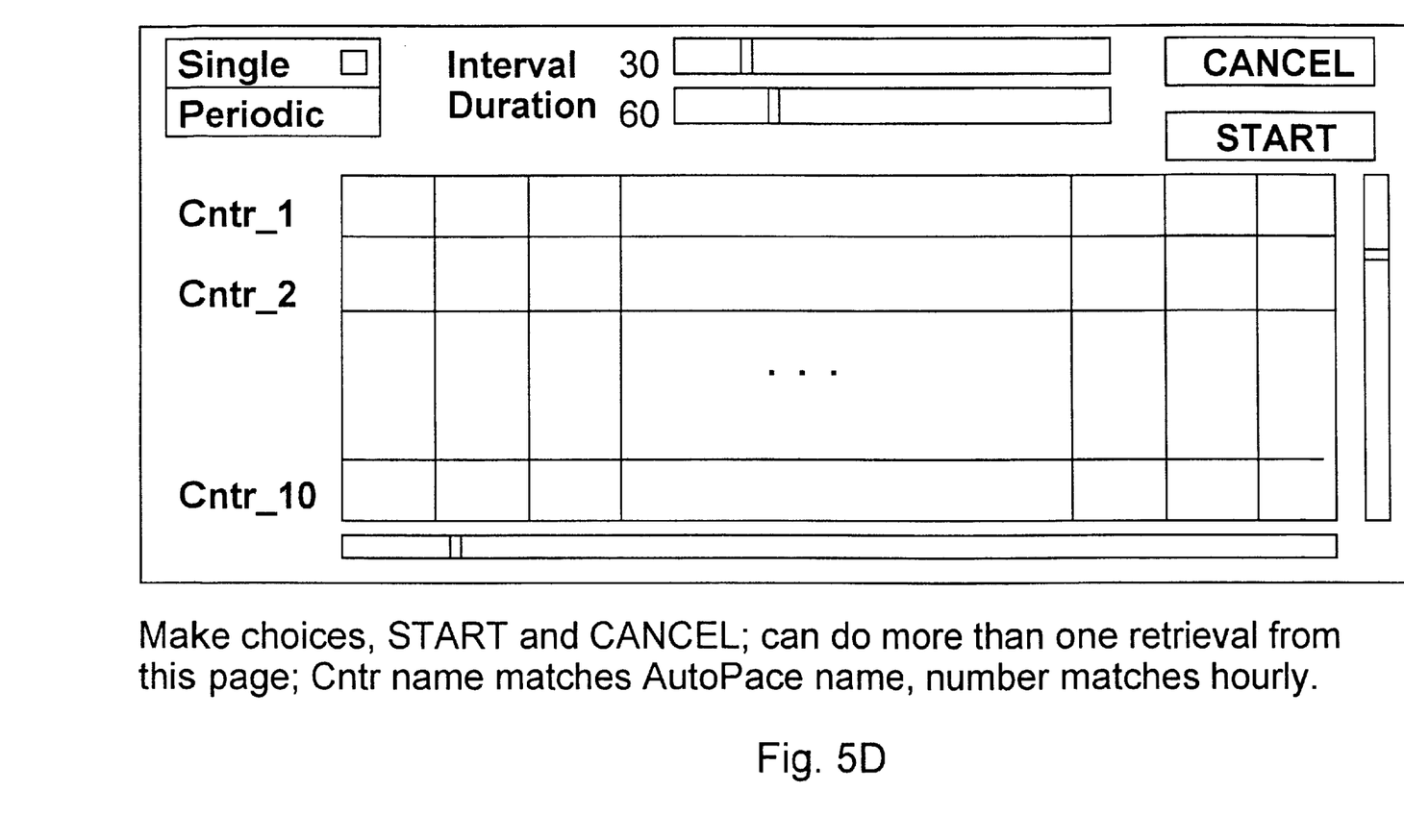
FIG. 5D shows an SM traffic measurements display screen of the present invention.
Figure 5E:
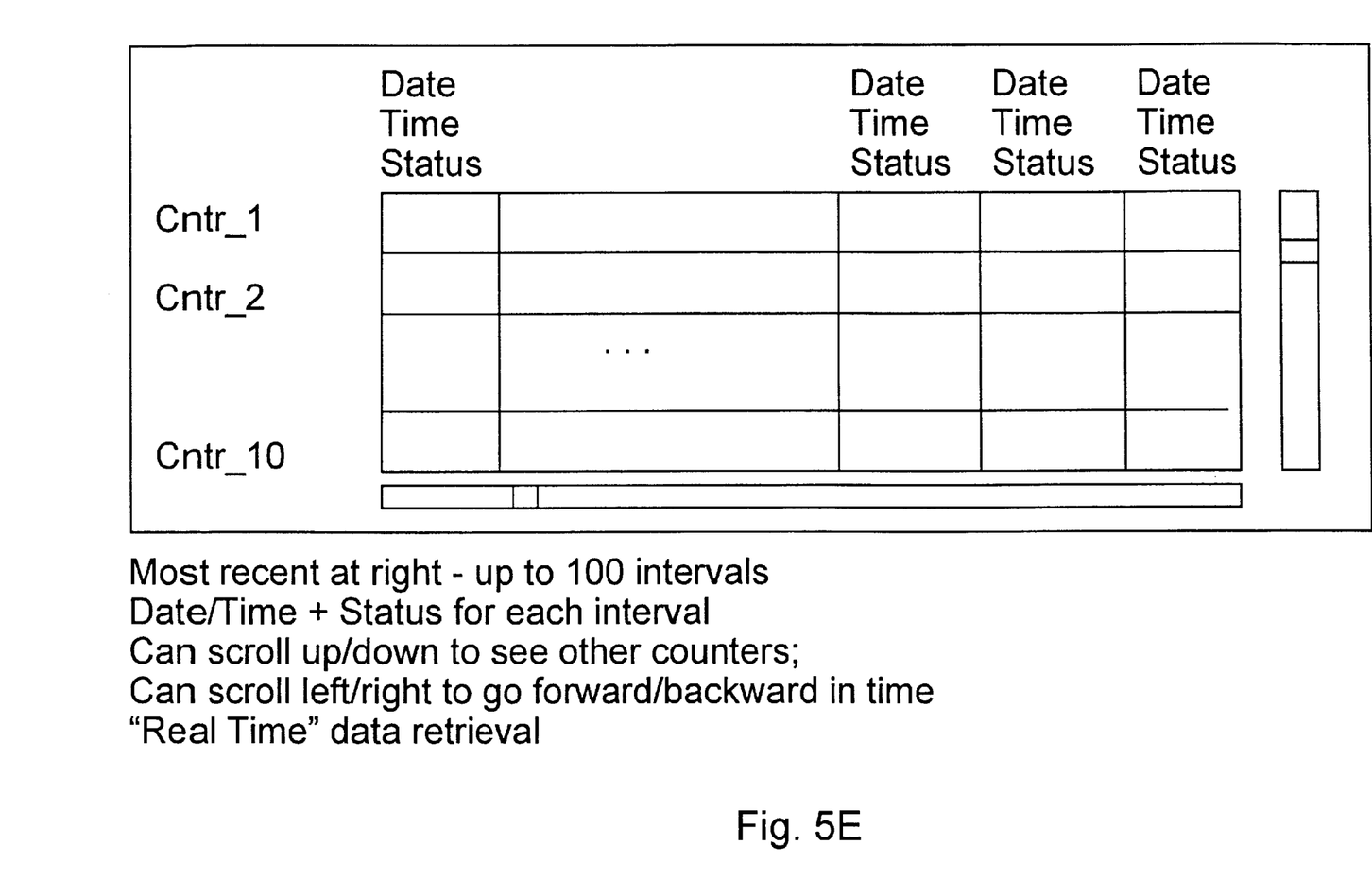
FIG. 5E shows the final screen encountered by the user using the present invention.

Once these selections are made, the user sees the screen of FIG. 5C. The "aaaaa", "bbbbb", and "ccccc" represent specific counts per category. They are shown with the AutoPACE name, filed number, and long name. The user is then shown a listing of all the counts which are available to them, and a selection for "ALL" the listed counts.

Scenario#1—Single SM count/Snapshot

The user marks the single count in which they are interested, starting with the screen of FIG. 5A and continuing through the screen of FIG. 5C. The user is then presented with the SM traffic measurements display screen of FIG. 5D. The user selects "Single Sample" and clicks the start button. The data retrieved by the SM tool is displayed on the screen of FIG. 5E which includes the date and time the data are collected. The count represents the information obtained since the top of the hour, which is when the automatic hourly SM count is taken.

Scenario#2—Single SMcount/Periodic

The user marks the single count in which they are interested, starting with the screen of FIG. 5A and continuing through the screen of FIG. 5C. The user is then presented with the SM traffic measurements display screen of FIG. 5D. The user chooses the "Periodic" selection. Next, the user selects the reporting interval by setting the "Sampling Interval" for a value between 30 and 300 seconds. The user then clicks on the start icon to start the data collection process. The data retrieved by the SM tool is displayed on the screen of FIG. 5E. The screen displays at least four (4) instances of the data. If previous data from this collection instance are present, the screen scrolls to the left. The top of the display shows the day and time of the collection period. Data which has scrolled off of the screen is obtainable via a scroll bar at the bottom of the page. The user clicks on the "CANCEL" icon to stop data collection. By default, a collection interval lasts 60 minutes, with a maximum collection interval of 8 hours. The count represents the value since the top of the hour when the automatic hourly SM count is taken.

Scenario#3—Multiple counts/Snapshot

The user chooses either the "ALL" selection or marks multiple counts for collection on the screen of FIG. 5C. The user is then presented with the SM traffic measurements display screen of FIG. 5D. The user selects "Single Sample" and clicks the start button. The data retrieved by the SM tool are displayed on the screen of FIG. 5E and includes the date and time the data are collected. Up to 10 counts are made available per screen. If more than 10 counts are selected, the user can view the data using a scroll bar at the side of the screen. The counts represent the value since the top of the hour when the automatic hourly SM count is taken.

Scenario#4-Multiple counts/Periodic

The user chooses either the "ALL" selection or marks multiple counts for collection on the screen of FIG. 5C. The user is then presented with the SM traffic measurements display screen of FIG. 5D. The user chooses the "Periodic" selection. Next, the user selects the reporting interval by setting the "Sampling Interval" for a value of between 30 and 300 seconds. The user then clicks on the start icon to start the data collection process. The data retrieved by the SM tool are displayed on the screen of FIG. 5E. The screen displays at least four (4) instances of the data. If previous data from this collection instance are present, the screen scrolls to the left. The top of the display shows the day and time of the collection period. Data which has scrolled off of the screen is obtainable via a scroll bar at the bottom of the page. Up to 10 counts are made available per screen. If more than 10 counts are selected, the user can view the data using a scroll bar at the side of the screen. The user clicks on the "CANCEL" icon to stop data collection. By default, a collection interval lasts 60 minutes, with a maximum collection interval of 8 hours. The counts represent the value since the top of the hour when the automatic hourly SM is taken.

The data that are observed via the present invention are preferably per cell site. The on-demand feature shows how the system is running at a specific interval of time rather than showing an accumulation of hourly data. Collecting the data hourly does not reveal the peaks and valleys of usage that actually cause the dropping of calls or reduction in voice quality. The invention allows a manager to make changes in configuration to the system, such as adding equipment temporarily to decrease overload conditions, and determine whether the configuration change fixes the problem.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

what is claimed is:

1. In a digital switching network wherein service measurements are periodically automatically collected, a method for a user to obtain on-demand service measurements, comprising the steps of:
    a) selecting at least one traffic count;
    b) providing a choice to said user whether said at least one traffic count is to be retrieved as a single sample or as a periodic sample;
    c) determining a location where said at least one traffic count resides in said network;
    d) retrieving said at least one traffic count from said location; and
    e) displaying said at least one traffic count to said user.

2. A method according to claim 1, wherein said step of displaying is done via a web browser.

3. A method according to claim 1, wherein, when said at least one traffic count is chosen by said user to be retrieved as a periodic sample, said user designates a period for said periodic sample.

4. A method according to claim 1, wherein said location is selected from the group consisting of ECP, DCS, cell site, link node, and SS7 node.

5. A method according to claim 1, wherein said at least one traffic count is selected from the group consisting of AGGR-S, AGGR-L, DCCH-CS, CDMA-CS, and CP-AMPS.

6. A method according to claim 5, wherein said at least one traffic count is further selected from the group consisting of antenna face, vocoder type, mobile power class, and server group along with an antenna face associated with said server group.

7. In a digital switching network wherein service measurements are periodically automatically collected, an apparatus for a user to collect on-demand service measurements, comprising:
    a) selection means for said user to select at least one traffic count to be collected;
    b) means for providing a choice to said user whether said at least one traffic count is to be retrieved as a single sample or as a periodic sample;
    c) determining means, associated with said selection means, for determining a location where said at least one traffic count resides in said network;
    d) means, associated with said selection means and said determining means, for retrieving said at least one traffic count from said location; and
    e) means for displaying said at least one traffic count to said user.

8. An apparatus according to claim 7, further comprising means, when said at least one traffic count is chosen by said user to be retrieved as a periodic sample, for said user to designate a period for said periodic sample.

9. An apparatus according to claim 7, wherein said location is selected from the group consisting of ECP, DCS, cell site, link node, and SS7 node.

10. An apparatus according to claim 7, wherein said at least one traffic count is selected from the group consisting of AGGR-S, AGGR-L, DCCH-CS, CDMA-CS, and CP3-AMPS.

11. An apparatus according to claim 10, wherein said at least one traffic count is further selected from the group consisting of antenna face, vocoder type, mobile power class, and server group along with an antenna face associated with said server group.

12. In a digital switching network wherein service measurements are periodically automatically collected, an apparatus for a user to collect on-demand service measurements, comprising:
    a) a first computer processor;
    b) a second computer processor;
    c) a browser installed in said second computer processor;
    d) said first computer processor being linked to said second computer processor;
    e) means, in said second computer processor, for selecting at least one traffic count to be collected;
    f) means, in said second computer processor, for providing a choice to said user whether said at least one traffic count is to be retrieved as a single sample or as a periodic sample;
    g) means, in said first computer processor, for determining a location where said at least one traffic count resides in said network;
    h) means, in said first computer processor, for retrieving said at least one traffic count from said location; and
    i) means, associated with said second computer processor, for displaying said at least one traffic count to said user.

13. An apparatus according to claim 12, wherein said first computer processor is linked to said second computer processor via a TCP/IP network.

14. An apparatus according to claim 12, wherein said second computer processor is selected from the group consisting of a PC, an X-window terminal, and a GUI workstation.

* * * * *